FIP8212 XR 3,876,311

United States Patent [19]

[11] 3,876,311

Sasayama

[45] Apr. 8, 1975

[54] TWO-AXIS PHOTOELECTRIC DETECTOR DEVICE

[75] Inventor: Shinya Sasayama, Kawasaki, Japan

[73] Assignee: Nippon Kogaku K.K., Tokyo, Japan

[22] Filed: Apr. 30, 1974

[21] Appl. No.: 465,571

[52] U.S. Cl. ................. 356/167; 250/201; 318/640
[51] Int. Cl. ..... G01b 11/00; G01j 1/20; G05b 1/06
[58] Field of Search ..... 318/640; 356/167; 250/201, 250/203

[56] References Cited

UNITED STATES PATENTS 3,739,247 5/1972 Yamaguchi et al. ................ 318/640

*Primary Examiner*—Eli Lieberman
*Assistant Examiner*—T. N. Grigsby
*Attorney, Agent, or Firm*—Fitzpatrick, Cella, Harper & Scinto

[57] ABSTRACT

A two-axis photoelectric detector device for detecting the position of a body with respect to two directions comprises a plate having a reticle slit disposed at a position conjugate with a reticle mark of the body with respect to an objective lens, two scanning means orthogonally disposed forwardly of the slit for oscillating a light beam and the two slit portions of the reticle slit relatively to each other, a photoelectric converter for receiving the light passed through the slit, and two synchronous rectifier circuits for receiving electrical signals from the photoelectric converter. A signal is applied from an oscillator to one of the synchronous rectifier circuits and one of the scanning means. A signal 90° out of phase with the signal from the oscillator is applied to the other synchronous rectifier circuit and the other scanning means. The outputs of the two synchronous rectifier circuits are delivered to two indicating meters, respectively.

3 Claims, 5 Drawing Figures

TWO-AXIS PHOTOELECTRIC DETECTOR DEVICE

BACKGROUND OF THE INVENTION

1. Field of the Invention

This invention relates to a photoelectric microscope for detecting the position of a stationary body with respect to two axes.

2. Description of the Prior Art

A photoelectric microscope is known which is capable only of detecting the position of a body with respect to a direction perpendicular to a linear mark formed thereon, and utilization of such photoelectric microscope for the detection of the position of the body with respect to the directions of two axes would require the use of two sets of marks and detector devices which in turn would complicate the overall device.

There has also been proposed a device which uses a mark slit in the form of reticle and two scanning means of different frequencies orthogonally disposed and in which light is received by a single photoelectric converter and two signals are separated by utilization of the difference between the frequencies. Such device, however, requires the provision of oscillators, tuning amplifiers and synchronous rectifier circuits for the respective frequencies, again resulting in a relatively complicated device.

SUMMARY OF THE INVENTION

Accordingly, I contribute by the present invention a two-axis photoelectric microscope of simple construction by which I am able to overcome the foregoing difficulties and disadvantages and which enables me to detect the position of a body with respect to two axes.

As an important aspect of the present invention, the two-axis photoelectric detector device for detecting the position of a body with respect to two directions or axes comprises mark means consisting of two linear marks formed on the body and extending in two directions, an image-forming lens system for forming the image of the mark means, a slit plate having two slit portions disposed at locations conjugate with the marks with respect to the image-forming lens system and extending in two directions corresponding to those of the marks. Actually, the two marks and the two slits extend in orthorgonal directions.

I provide first scanning means for causing an image-forming light beam for one of the linear marks passed through the lens system and one of the slit portions corresponding to that linear mark to be relatively scanned at a predetermined frequency and in a direction perpendicular to the lengthwise direction of that linear mark and the corresponding slit portion, and second scanning means for causing an image-forming light beam for the other linear mark and the other slit portion corresponding to such other linear mark to be relatively scanned at the predetermined frequency and in a direction perpendicular to the lengthwise direction of such other linear mark and slit portion but with a phase delay of 90° with respect to that of the first scanning means. Photoelectric converter means are provided for converting into electrical signals the light passed through the slit portions of the slit plate. Synchronous rectifier means are provided for separating the output signals from the photoelectric converter means into a signal in phase with the scanning of the first scanning means and of the same frequency as the frequency of the scanning and a signal in phase with the scanning of the second scanning means and of the same frequency as the frequency of the latter scanning. The device may further comprise two indicator members to which the two signals from the synchronous rectifier means are applied as input.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

Specific embodiments of the invention have been chosen for purposes of illustration and description, and are shown in the accompanying drawings forming a part of the specification wherein.

DESCRIPTION OF THE PREFERRED EMBODIMENTS

Figures 1, 3A, 3B, 4:
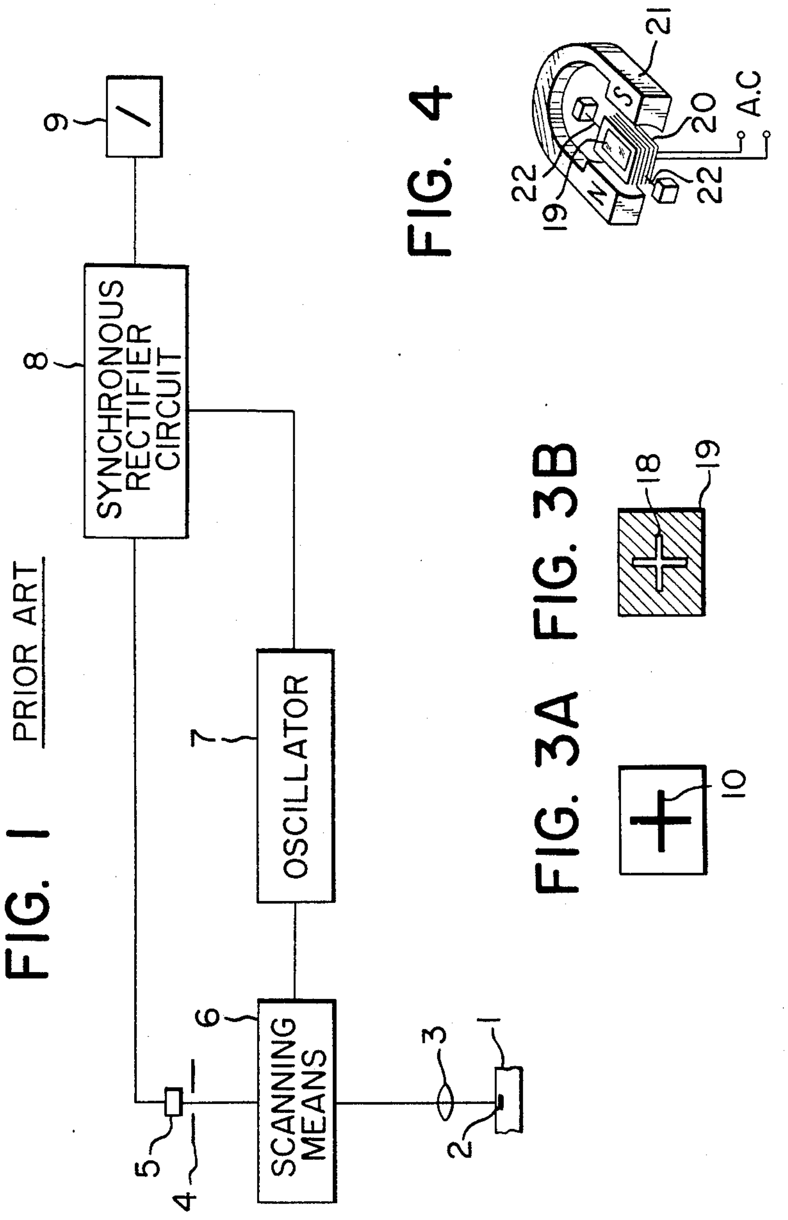
FIG. 1 is a diagrammatic representation of a photoelectric microscope according to the prior art.
FIGS. 3A and 3B illustrate a mark and slit which may be used with the photoelectric detector device according to the present invention.
FIG. 4 is a perspective view of the scanning means.

In order better to understand the preferred embodiments of my invention, I shall first briefly describe the operation of the photoelectric microscope according to the prior art as shown in FIG. 1 of the accompanying drawings wherein a body 1 to be detected is formed with a linear mark 2, the image of which may be focused on a slit 4 by an objective lens 3 and the image-carrier light is received by a photoelectric converter 5 disposed behind the slit 4. Disposed forwardly of the slit 4 is a scanning means 6 which may be driven from an oscillator 7. The scanning means 6 may be oscillated in a sine form and scan the image of the mark 2 perpendicularly to the slit 4 or scan the slit perpendicularly to the light beam. The scanning means 6 is constructed in the manner as shown in FIG. 4 and comprises a glass plate 19 having a coil 20 wound thereon and movably suspended in the field of a magnet 21 by means of a copper wire 22. Supply of an AC sine-wave current to the coil 20 may cause sine-form oscillation of the glass plate 19. Thus, the output of the photoelectric converter 5 is a signal modulated at a frequency equal to the scanning frequency of the scanning means, and such output signal may be synchronously rectified by a synchronous rectifier circuit 8 at a frequency equal to the scanning frequency. The output of the synchronous rectification is indicated by an indicating meter 9.

Figure 2:
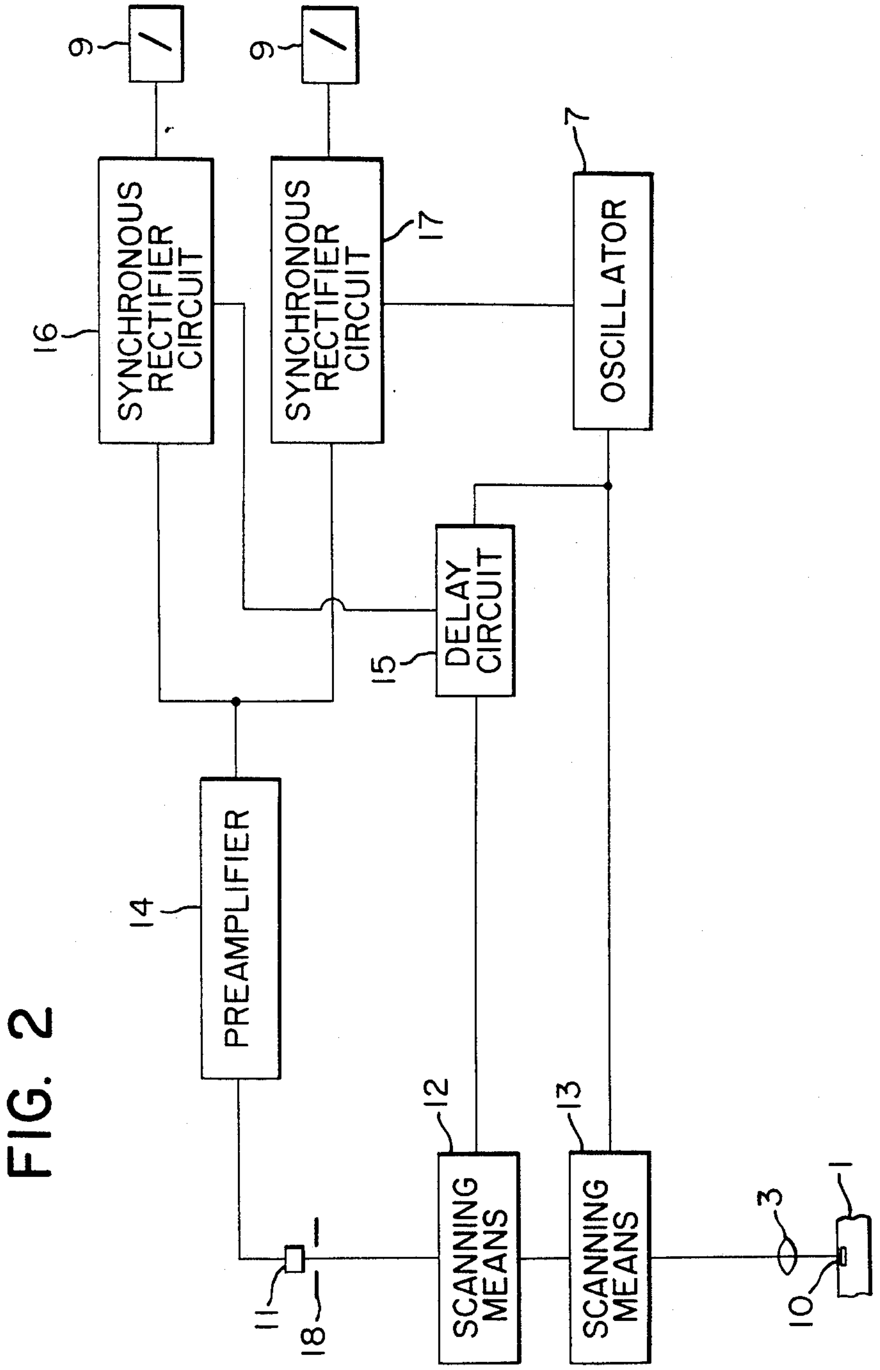
FIG. 2 is a diagrammatic representation of an embodiment of the present invention.

Referring to FIG. 2, I shall describe an embodiment of my invention wherein an optical system is arranged in such a manner that a reticle mark 10 (see FIG. 3A)

formed on a body 1 to be detected is focused by an objective lens 3 on a reticle slit 18 formed in a plate 19 (see FIG. 3B). Disposed behind the slit 18 is a photoelectric converter 11 for receiving light passed through the slit 18. Scanning means 12 and 13 are disposed forwardly of the reticle slit 18 and are constructed in the manner as shown in FIG. 4. These scanning means are for oscillating the light beam in two lengthwise directions of the reticle slit. In the drawing, the horizontal direction is referred to as X-axis and the vertical direction as Y-axis. The scanning means 12 and 13 are mechanical orthogonally disposed. A delay circuit 15 for converting a signal from an oscillator 7 into a signal 90° out of phase with respect thereto is connected between the scanning means 12 and the oscillator 7 so that one of the scanning means 13 receives a signal from the oscillator 7 while the other scanning means 12 receives a signal 90° out of phase with respect to the signal from the oscillator 7. A preamplifier 14 for amplifying the signal from the photoelectric converter 11 has its output terminal connected to the inputs of synchronous rectifier circuits 16 and 17. One of the synchronous rectifier circuits 17 receives the signal from the oscillator 7 while the other synchronous rectifier circuit 16 receives the signal 90° out of phase with respect to the signal from the oscillator 7. Indicating meters 9 and 9 are connected to the outputs of the respective synchronous rectifier circuits.

With such construction, the signal provided by the photoelectric converter 11 is modulated at a frequency equal to the scanning frequency (which is also equal to the frequency of the oscillator), and further that signal is a composite signal comprising a signal component $S_X$ provided by the X-axis portion of the reticle slit scanning the X-axis portion of the mark and a signal component $S_Y$ provided by the Y-axis portion of the reticle slit scanning the Y-axis portion of the mark. There is a phase difference of 90° between the signal components $S_X$ and $S_Y$. To enable the detection of the position of the body with respect to the two axes, these two signal components $S_X$ and $S_Y$ must be separated and taken out individually. As is well known, synchronous rectification means that a frequency component equal to the scanning frequency is taken out.

If the composite signal comprising the modulated signal in the X-axis direction, which is the signal from the preamplifier 14 and the modulated signal in the Y-axis direction, is synchronously rectified by the signal supplied from the oscillator 7 to that scanning means which effects the oscillation and scanning in the X-axis direction, then there is provided a signal synchronously rectified with respect to the X-axis direction, but the scanning signal component in the Y-axis direction has a phase difference of 90° with respect to the scanning signal component in the X-axis direction and is thus negated to provide no output. Conversely, if the composite signal from the preamplifier 14 is synchronously rectified by the signal supplied from the oscillator 7 to that scanning means which effects the oscillation and scanning in the Y-axis direction, then there is provided a signal synchronously rectified with respect to the Y-axis direction but the scanning signal component in the X-axis direction is negated for the reason set forth above.

Thus, as the signal from the preamplifier 14 passes through the synchronous rectifier circuits 16 and 17, it is converted into synchronously rectified signals separated with respect to the X- and Y-axes, and these separated signals displace the needles of the indicating meters 9 and 9 to enable the detection of the position of the body with respect to the directions of two axes.

The present embodiment has been shown as using scanning means for oscillating the light beam relative to the slit, whereas it will be apparent that the same result can be achieved by oscillating the slit relative to the light beam.

Thus, from the foregoing description it will be seen that according to the present invention, detection of the position with respect to the directions of two axes can be achieved by an electrophotographic microscope of simple construction without resorting to the conventional devices using different frequencies.

I believe that the construction and operation of my novel two-axis photoelectric detector device will be understood and that the advantages thereof will be fully appreciated by those persons skilled in the art.

I claim:

1. A two-axis photoelectric detector device for detecting the position of a body with respect to two directional axes, comprising:

i. mark means consisting of two linear marks formed on said body and extending in two directions;

ii. an image-forming lens system for forming the image of said mark means;

iii. a slit plate having two slit portions disposed at locations conjugate with said marks with respect to said image-forming lens system and extending in two directions corresponding to said marks;

iv. first scanning means for causing an image-forming light beam for one of said linear marks passed through said lens system and one of said slit portions corresponding to said one linear mark to be relatively scanned at a predetermined frequency and in a direction perpendicular to the lengthwise direction of said one linear mark and said one slit portion;

v. second scanning means for causing an image-forming light beam for the other linear mark and the other slit portion corresponding to said other linear mark to be relatively scanned at said predetermined frequency and in a direction perpendicular to the lengthwise direction of said other linear mark and said other slit portion but with a phase delay of 90° relative to said first scanning means;

vi. photoelectric converter means for converting into electrical signals the light passed through said slit portions of said slit plate; and vii. synchronous rectifier means for separating the output signals from said photoelectric converter means into a signal in phase with the scanning of said first scanning means and of the same frequency as the frequency of said first scanning and a signal in phase with the scanning of said second means and of the same frequency as the frequency of said latter scanning.

2. A two-axis photoelectric detector device according the claim 1, wherein said two linear marks extend in orthogonal directions and said two slit portions extend in orthogonal directions.

3. A two-axis photoelectric detector device according the claim 1, further comprising two indicator members receiving as input the two signals from said synchronous rectifier means.

* * * * *

UNITED STATES PATENT OFFICE
CERTIFICATE OF CORRECTION

Patent No. 3,876,311 Dated April 8, 1975

Inventor(s) SHINYA SASAYAMA

It is certified that error appears in the above-identified patent and that said Letters Patent are hereby corrected as shown below:

Front page, beneath "[21] Appl. No.: 465,571", insert:

-- [30] Foreign Application Priority Data

May 12, 1973 Japan ............... 48-52129 --

Signed and sealed this 1st day of July 1975.

(SEAL)
Attest:

RUTH C. MASON
Attesting Officer

C. MARSHALL DANN
Commissioner of Patents
and Trademarks